(12) United States Patent
Huang

(10) Patent No.: US 7,144,116 B2
(45) Date of Patent: Dec. 5, 2006

(54) DIGITAL LIGHT PROCESSING PROJECTOR

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 224 days.

(21) Appl. No.: 10/938,796

(22) Filed: Sep. 9, 2004

(65) Prior Publication Data

US 2005/0057729 A1    Mar. 17, 2005

(30) Foreign Application Priority Data

Sep. 16, 2003   (TW) .............................. 92125461 A

(51) Int. Cl.
  G03B 21/00   (2006.01)
  G03B 21/26   (2006.01)
  G03B 21/28   (2006.01)
(52) U.S. Cl. ............................. 353/33; 353/31; 353/34; 353/37; 353/99
(58) Field of Classification Search ................. 353/31, 353/33, 99, 34, 37
See application file for complete search history.

(56) References Cited

U.S. PATENT DOCUMENTS

| 6,172,816 B1 * | 1/2001 | Tadic-Galeb et al. | ....... 359/649 |
| 6,863,401 B1 * | 3/2005 | Penn | ........................... 353/31 |
| 6,959,990 B1 * | 11/2005 | Penn | ........................... 353/81 |

* cited by examiner

Primary Examiner—Melissa Jan Koval
(74) Attorney, Agent, or Firm—J.C. Patents

(57) ABSTRACT

A digital light processing projector comprising a light source, a splitter module, a plurality of total internal reflection (TIR) prisms and digital mirror devices (DMDs), a combiner and a projection lens is provided. The splitter module is disposed in the light path of the light after the light source to split the light into a plurality of color lights. Each color light is incident to the total reflection plane of the TIR prism with an incident angle larger than the critical angle, and then is totally reflected to the DMD. Thereafter, each color light is reflected by the DMD being incident to the total reflection plane of the TIR prism with an incident angle smaller than the critical angle, and then passes through the TIR prism directly. The color lights passing through the TIR prisms are combined by the combiner and then projected by the projection lens.

12 Claims, 4 Drawing Sheets

DIGITAL LIGHT PROCESSING PROJECTOR

CROSS-REFERENCE TO RELATED APPLICATION

This application claims the priority benefit of Taiwan application serial no. 92125461, filed on Sep. 16, 2003.

BACKGROUND OF THE INVENTION

1. Field of the Invention

The present invention relates to a digital light processing (DLP) projector. More particularly, the present invention relates to a DLP projector without any special optical component such as the conventional Philip prism.

2. Description of Related Art

In a conventional digital light processing (DLP) projector, a key component called "digital mirror device" (DMD) is the fundamental semiconductor component, which is controlled by two-bit pulse modulation. The chip of the digital mirror device is adopted for controlling the digital optical switch by rapidly and precisely reflecting the light source. Unlike the conventional liquid crystal projector that modulates the light by using liquid crystal (LCD) to change the polarization state, DLP projector uses the reflection of micro mirrors to modulate the light. Therefore, the weight of the DLP projector may be reduced to 2.5 kg or less, compared with 8 to 15 kg of a conventional projector. In addition, the volume of the DLP projector can also be minimized. In general, the optical efficiency and contrast of the DLP projector is better than that of the conventional projector, since the digital mirror device uses non-polarized light and switches light by mirrors. Therefore, the DLP projector can be used when high brightness and high resolution is required. In addition, the image reproduced from the DLP projector is a real and stable digital image with correct colors.

FIG. 1 is a schematic plan view of the internal of a conventional DLP projector. As shown in FIG. 1, a conventional DLP projector includes a light source 111, a rod integrator 112, a lens set 113, a reflection mirror 115, an optical splitter and combiner module 120, and a projection lens 119. Wherein, the light 11 is emitted from the light source 111, and is condensed on the reflection mirror 115 via the rod integrator 112 and the lens set 113.

Please refer to FIG. 1. The conventional optical splitter and combiner module 120 includes a total internal reflection (TIR) prism 117 and a Philips prism 121. After the light 11 is reflected from the reflection mirror 115 to the total reflection plane 117a of the TIR prism 117, the incident angle A1 of the light 11 being incident to the total reflection plane 117a is larger than the critical angle of total reflection. In addition, the light 11 penetrates from an optically dense medium to an optically less dense medium since an air gap is located between the two prisms 31 and 32 of the TIR prism 117. Therefore, the light 11 is totally reflected from the total reflection plane 117a into the Philips prism 121.

The Philips prism includes two dichroic coatings, wherein coating 118a reflects the red color light 13 of the light 11 and allows transmission of other color lights, and coating 118b reflects the blue light 15 of other color lights transmitted from the coating 118a, and allows transmission of the green light 17. Accordingly, after the light 11 passes through the Philips prism 121, the light 11 is separated into the red color light 13, the green color light 17, and the blue light 15. Three color lights 13, 15 and 17 are incident to the digital mirror devices 121, 122, and 123 in specific incident angles respectively.

The red color light 13, the green color light 17, and the blue light 15 are incident to the digital mirror devices 121, 122, and 123 are reflected respectively. The reflected red color light 13, green color light 17 and blue light 15 represent the red image, the green image and the blue image respectively. Finally, the red image, the green image and the blue image are incident to the total reflection plane 117a. At this moment, since the incident angle A2 of the red image, the green image and the blue image being incident to the total reflection plane 117a is smaller than the critical angle of total reflection, the red image, the green image and the blue image will penetrate the total reflection plane 117a of the TIR prism 117 directly. Therefore, the red image, the green image and the blue image are projected via the projection lens 119.

In the conventional DLP projector, the light from the light source is not separated into the red color light, the green color light, and the blue light before it is incident to the Philips prism. The Philips prism splits the light from the light source. However, the heavy Philips prism occupies most weight in the whole DLP projector. In addition, the light path in the Philips prism is too long and complex since the Philips prism includes optical splitters and optical combiners. Therefore, when the light travels in the Philips prism, the deformation due to, for example, thermal expansion or reduction may alter the physical property of the lights. As a result, the quality of the projected image is poor. In addition, the digital mirror device needs to be disposed beside the Philips prism in a specific angle, which occupies a lot of space that the whole volume and thickness of the projection device can not be reduced.

SUMMARY OF THE INVENTION

Therefore, the present invention is directed to a digital light processing (DLP) projector with light weight and small size. In addition, projection quality is not easily altered by temperature variations.

According to one embodiment of the present invention, a digital light processing (DLP) projector comprising a light source, a splitter module, a plurality of total internal reflection (TIR) prisms, a plurality of digital mirror devices, a combiner and a projection lens is provided. Wherein, after a light emitted from the light source passes through a rod integrator into the splitter module, the light is split into a plurality of color lights. The TIR prisms are disposed in the light paths of the color lights after the splitter module respectively, and the digital mirror devices are disposed in the light paths of the color lights after the TIR prisms respectively. The color lights are totally reflected by the TIR prisms respectively and are incident to the digital mirror devices. Then, the color lights are again reflected by the digital mirror devices respectively, and pass through the TIR prisms directly. The combiner is disposed in the intersection of the light paths of the color lights after the TIR prisms. The combiner comprises, for example but not limited to, an X-cube comprising two two-way splitter coatings orthogonal to each other. Therefore, the color lights are combined and projected to the screen and form the image.

In one embodiment of the present invention, the splitter module comprises, for example but not limited to, a first two-way splitter mirror and a second two-way splitter mirror. Wherein, the first two-way splitter mirror is disposed in the light path of the light after the light source and the rod integrator, and is adopted for reflecting the first color light and allowing the second color light and the third color light to pass through. The second two-way splitter mirror is disposed in the light path of the second and third color light after the first two-way splitter mirror. Wherein, the second two-way splitter mirror is adopted for reflecting the second color light and allowing the third color light to pass through.

In one embodiment of the present invention, the splitter module may further comprise at least a first condenser lens and a plurality of second condenser lenses. Wherein, the first condenser lens is disposed in the light path between the light source and the first two-way splitter mirror, and the second condenser lenses are disposed in the light paths of the first color light, the second color light and the third color light between the first two-way splitter mirror and the TIR prisms. In one embodiment of the present invention, in order to compensate the difference among light paths, the magnification of all the condenser lens of each light path is the same.

In one embodiment of the present invention, the splitter module further comprises, for example but not limited to, a first reflection mirror and a second reflection mirror. Wherein, the first reflection mirror is disposed in the light path between the light source and the first two-way splitter mirror. The second reflection mirror is disposed in the light path of the first color light, the second color light and the third color light between the first two-way splitter mirror and the TIR prisms.

In one embodiment of the present invention, each TIR prism comprises, for example but not limited to, a first prism and a second prism. Wherein, the first prism comprises a total reflection plane, and the second prism comprises a light incidence plane. In addition, an air gap is disposed between the total reflection plane of the first prism and the light incidence plane of the second prism.

In one embodiment of the present invention, each digital mirror device includes an active surface comprising a plurality of micro mirrors arranged in a matrix structure. In one embodiment of the present invention, the angle between the micro mirrors and the active surface is in a range of about 12° to about −12°, and thus the incident angle of the color light being incident to the active surface of the digital mirror device is about 24°. In another embodiment of the present invention, the angle between the micro mirrors and the active surface is in a range of about 10° to about −10°, and thus the incident angle of the color light being incident to the active surface of the digital mirror device is about 20°.

Accordingly, in the DLP projector of the present invention, the light from the light source has been split into a red color light, a green color light and a blue light by the splitter component before the light is incident to the TIR prisms. The three color lights are combined by a device that includes two dichroic beam splitters. It should be noted that, this device with two beam splitters, such as a X-cube, is lighter, smaller, cheaper, and has a shorter light path than the conventional Philips prism. Therefore, the weight of the DLP projection device can be greatly reduced. In addition, the quality of projection can be improved due to the shorter light path. Moreover, the influence of thermal diffractions of the two-way lens in the present invention is slighter compared with the conventional Philips prism. Therefore, the influence of temperature variations on the projection quality may be reduced to the minimum.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
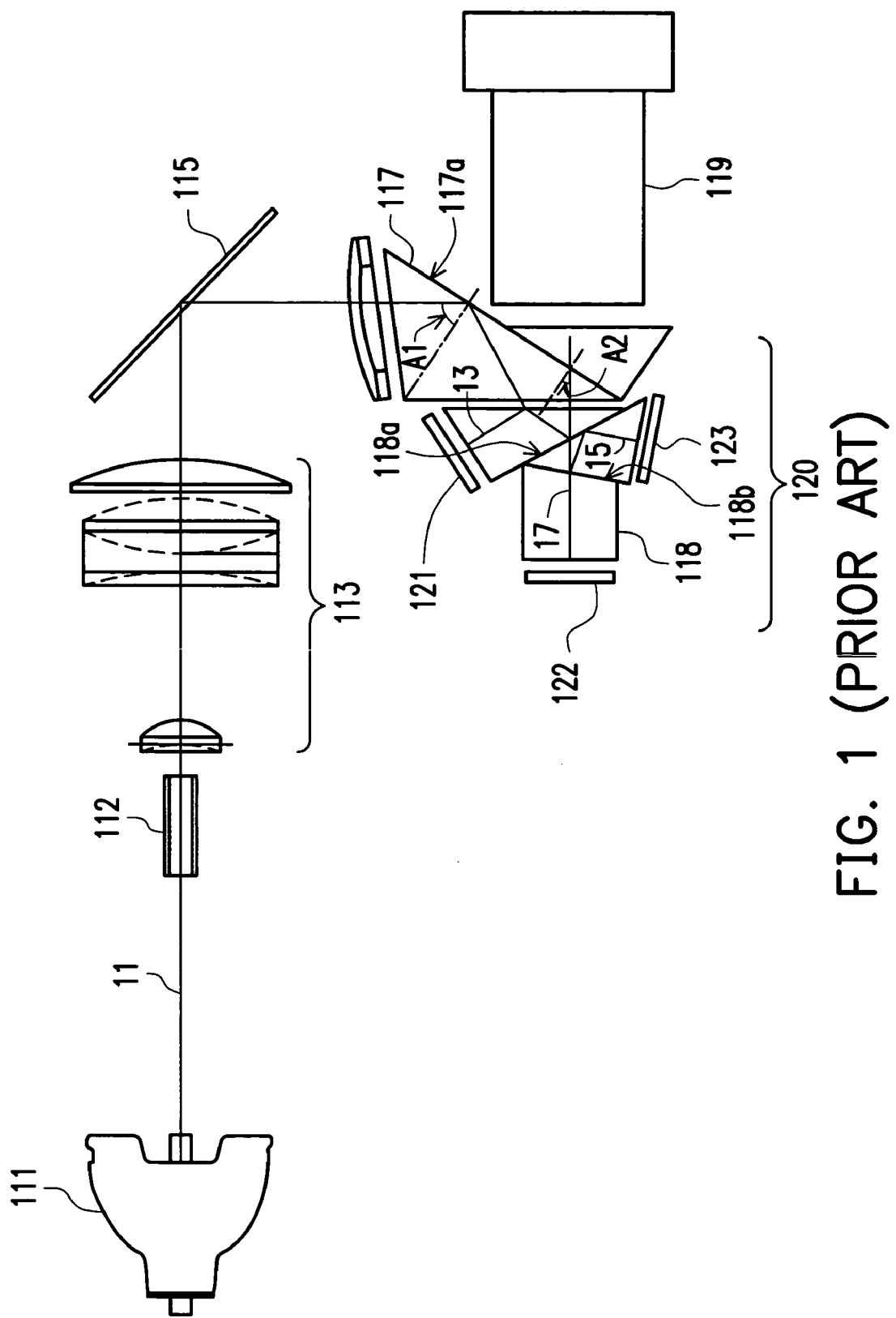
FIG. 1 is a schematic plan view of the internal of a conventional DLP projector.
Figure 2:
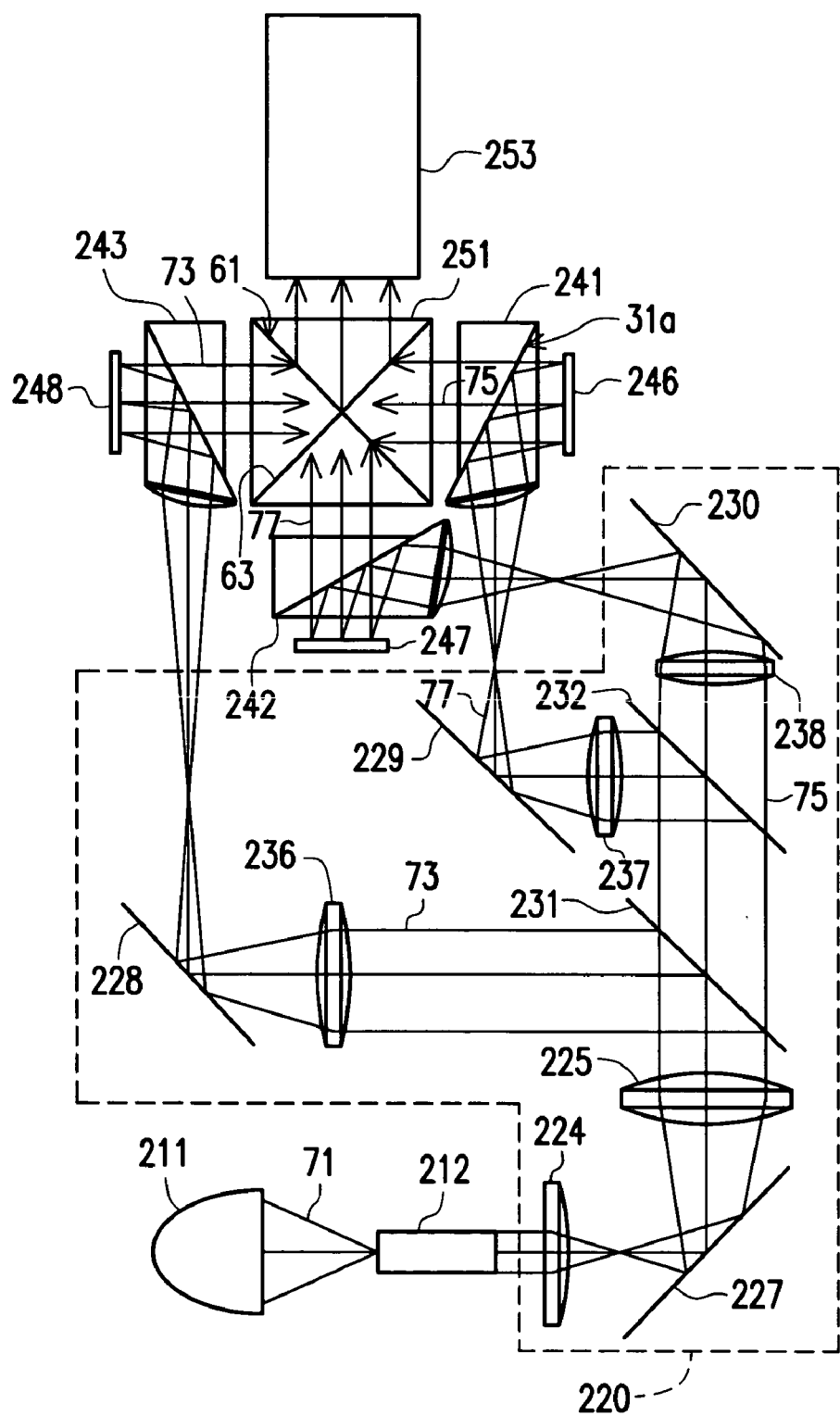
FIG. 2 is a schematic plan view of a DLP projector according to one embodiment of the present invention.

FIG. 2 is a schematic plan view of a DLP projector according to one embodiment of the present invention. Please refer to FIG. 2. A DLP projector comprises, for example but not limited to, a light source 211, a splitter module 220, total internal reflection (TIR) prisms 241, 242, and 243, digital mirror devices 246, 247, and 248, a combiner 251 and a projection lens 253. Wherein, the light source 211 can comprise a cold cathode fluorescence bulb. In one embodiment of the present invention, in order to enhance the optical property of the light source, an optional rod integrator 212 may be adopted for improving the quality of projection. Therefore, in the present invention, the light 71 emitted from the light source 211 enters the splitter module 220 via the rod integrator 212. In other words, the splitter module 220 is disposed in the light path of light 71 after the light source 211 and the rod integrator 212. The TIR prisms 241, 242, and 243 are disposed in the light paths of each color light after the splitter module 220 respectively. The digital mirror devices 246, 247, and 248 are disposed in the light paths of each color lights after the TIR prisms 241, 242, and 243 respectively. The combiner 251 is disposed in the intersection of the color lights after the TIR prisms 241, 242, and 243. The projection lens 253 is disposed in the light path of each color lights after the combiner 251.

In one embodiment of the present invention, the splitter module 220 may comprise a first two-way splitter mirror 231 and a second two-way splitter mirror 232. The splitter module 220 may optionally comprise other optical components such as reflection mirror and/or condenser lens. In the present embodiment, the reflection mirrors 227, 228, 229, and 230 and the condenser lenses 224, 225 and 236, 237, 238 are optionally illustrated as an exemplary example for a clear description, and should not be used to limit the scope of the present invention.

As shown in FIG. 2, the first two-way splitter mirror 231 is disposed in the light path of light 71 after the light source 211, and the second two-way splitter mirror 232 is disposed in the light paths of the second color light 75 and the third color light 77 after the first two-way splitter mirror 231. The condenser lenses 224 and 225 are disposed in the light paths between the light source 211 and the first two-way splitter mirror 231, and the condenser lenses 236, 237, and 238 are disposed in the light paths of the first color light 73, the second color light 75, and the third color light 77 between the first two-way splitter mirror 231 and the TIR prisms 246 and 247 respectively. In order to compensate the difference of the three light paths between the condenser lenses 224, 225 and the three condenser lenses 236, 237 and 238 respectively, the total magnification of the whole lenses of the three light paths are mutually equal. In other words, the lens set comprising the condenser lens 224, 225 and 236, lens set comprising the condenser lens 224, 225 and 237, and lens set comprising the condenser lens 224, 225 and 238 have equal magnifying power.

In one embodiment of the present invention, a reflection mirror 227 may be disposed in the light path between the light source 211 and the first two-way splitter mirror 231 to change the direction light 71. In another embodiment of the present invention, reflection mirrors 228, 229, and 230 may also be disposed in the light paths of the first color light 73, the second color light 75 and the third color light 77 between the first two-way splitter mirror 231 and the TIR prisms 246 and 247 respectively. Therefore, the first color light 73, the second color light 75 and the third color light 77 may be incident to the TIR prisms 246, 247, and 248 respectively.

Hereinafter, the light paths in the DLP projector will be described in detail. After the light 71 passes through the rod integrator 212, it passes through the condenser lens 224, and then is reflected by the reflection mirror 227. Then, the light 71 is incident to the first two-way splitter mirror 231 via the condenser lens 225. The first two-way splitter mirror 231 reflects the first color light 73 of the light 71, and allows the second color light 75 and the third color light 77 to pass through. The first color light 73 is reflected by the first two-way splitter mirror 231, and passes through the condenser lens 236, and then is reflected by the reflection mirror 228 to the TIR prism 243. The second color light 75 and the third color light 77 pass the second two-way splitter mirror 232 after passing through the first two-way splitter mirror 231. Then, the second two-way splitter mirror 232 reflects the third color light 77 and allows the second color light 75 to pass through. Therefore, the third color light 77 reflected by the second two-way splitter mirror 232 passes the condenser lens 237, and then is reflected by the mirror 229 to the TIR prism 241. On the other hand, the second color light 75 passing through the second two-way splitter mirror 232 passes through the condenser lens 238, and then is reflected by the reflection mirror 230 to the TIR prism 242.

Please refer to FIG. 2, the digital mirror devices 246, 247, and 248 are disposed in the light paths of the totally reflected first color light 73, second color light 75 and third color light 77 after the TIR prisms 241, 242, and 243 respectively. Thereafter, the first color light 73, the second color light 75, and the third color light 77 will be reflected by the digital mirror devices 246, 247, and 248. At this moment, the reflected first color light 73, second color light 75, and third color light 77 will be incident to the total reflection plane 31a. It is noted that, since the incident angle described above is smaller than the critical angle of the total reflection plane, thus the first color light 73, the second color light 75, and the third color light 77 will not be totally reflected and will penetrate the TIR prisms 241, 242, and 243 directly.

In one embodiment of the present invention, the combiner 251 can comprise an X-cube. The combiner 251 is disposed at the intersection of the color lights 73, 75, and 77 penetrated from the TIR prisms 241, 242, 243. In one embodiment of the present invention, the X-cube comprises two mutually orthogonalized splitter coatings 61 and 63. Wherein, the splitter coating 61 reflects the first color light 73 and allows the second color light 75 and the third color light 77 to pass through. The splitter coating 63 reflects the second color light 75 and allows the third color light 77 to pass through. In other words, the first color light 73 will be incident to the splitter coating 63 of the X-cube and then be reflected after it passes through the TIR prism 243. The second color light 75 will be incident to the splitter coating 61 of the X-cube and then be reflected after it passes through the TIR prism 241. The third color light 77 will directly penetrate the splitter coating 61 and the splitter coating 63 after it passes through the TIR prism 242. Finally, the first color light 73, the second color light 75 and the third color light 77 will be projected by the projection lens 253.

Figure 3:
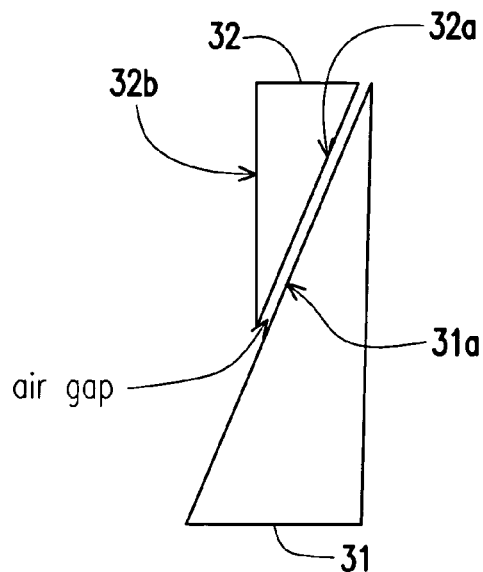
FIG. 3 is a schematic view of a total internal reflection (TIR) prism according to one embodiment of the present invention.

FIG. 3 is a schematic view of a total internal reflection (TIR) prism according to one embodiment of the present invention. Please refer to FIGS. 2 and 3. Each of the TIR prisms 241, 242, and 243 comprises prism 31 and prism 32. Wherein, the prism 31 comprises a total reflection plane 31a, and the prism 32 comprises a light incidence plane 32a. In addition, an air gap is located between the total reflection plane 31a and the light incidence plane 32a. After a light enters the TIR prism 241, the light enters the prism 31 and is incident to the total reflection plane 31a. Thereafter, since the prism 31 is an optically denser medium, and the air is an optically less dense medium, the light path of the light incident to the prism 31 passes from the optically denser medium to the optically less dense medium. In addition, when the incident angle of the light incident to the total reflection plane 31a is larger than the critical angle of the total reflection plane 31a, the light will be totally reflected by the total reflection plane 31a. Therefore, when the first color light 73, the second color light 75 and the third color light 77 enters the corresponding TIR prisms 241, 242, and 243 respectively, they will be totally reflected since the incident angle thereof is larger than the critical angle.

Figure 4:
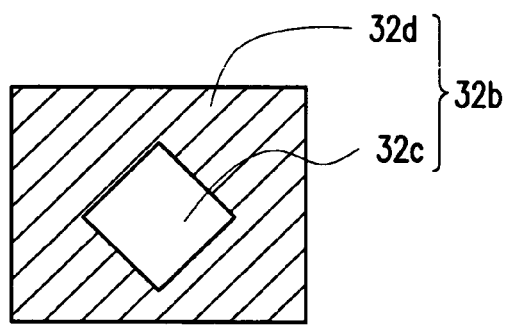
FIG. 4 is a cross-sectional view of a light exit plane according to one embodiment of the present invention.

FIG. 4 is a cross-sectional view of a light exit plane according to one embodiment of the present invention. Please refer to FIGS. 3 and 4. The prism 32 of the TIR prisms may further comprise a light exit plane 32b. It is noted that, not the whole region of the light exit plane 32b is allowed for the penetration of the light. As shown in FIG. 4, a mask layer 32d may be disposed on the light exit plane 32b. The light is only allowed to pass through the non-masked region 32 of the mask layer 32d. The mask layer 32d disposed on the light exit plane 32b is adopted to avoid the passing of stray lights, such as lights in the OFF state, which will alter the quality of the projected image.

Figure 5:
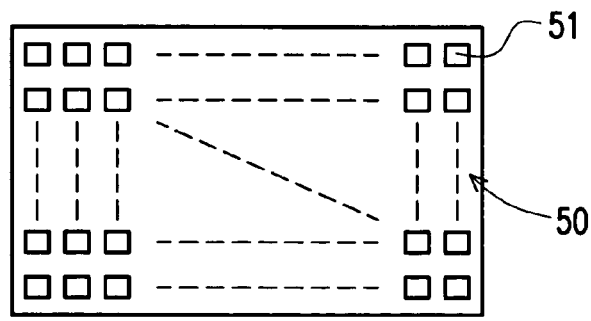
FIG. 5 is a schematic view of a digital mirror device (DMD) according to one embodiment of the present invention.
Figure 6A:
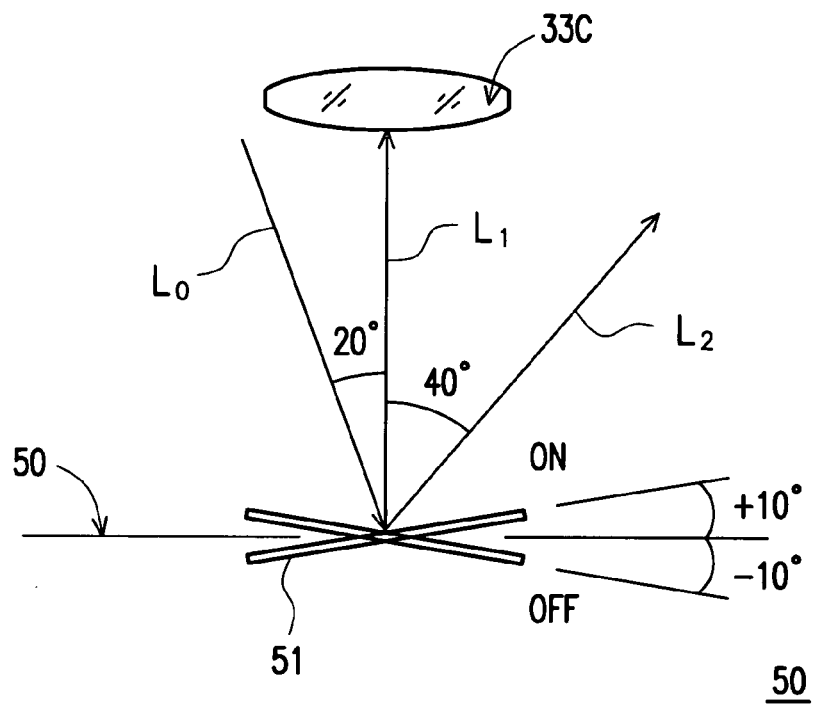
FIG. 6A is a schematic view of a micro mirror and active surface having an included angle 10° according to one embodiment of the present invention.
Figure 6B:
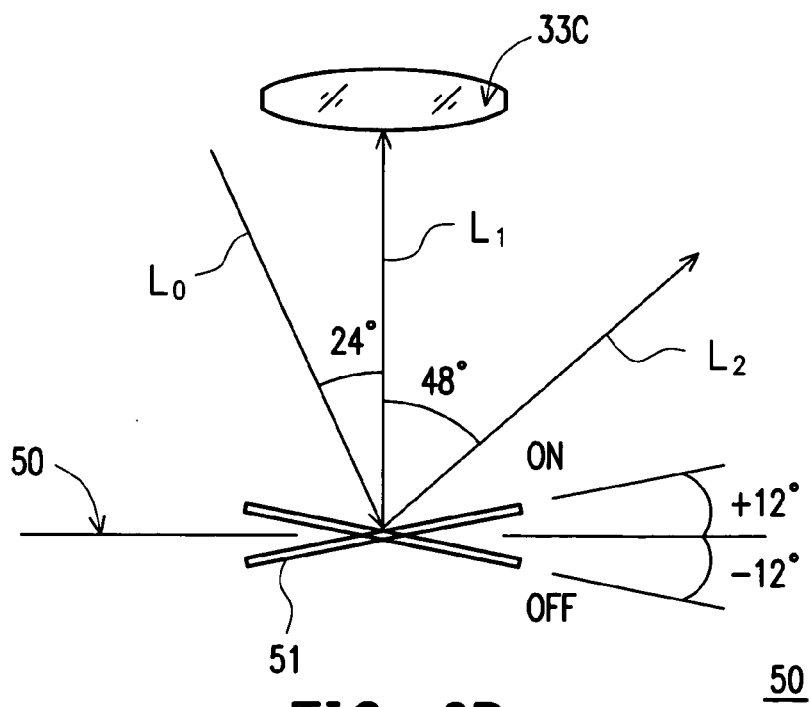
FIG. 6B is a schematic view of a micro mirror and active surface having an included angle 12° according to one embodiment of the present invention.

FIG. 5 is a schematic view of a digital mirror device (DMD) according to one embodiment of the present invention. FIG. 6A is a schematic view of a micro mirror and active surface having an included angle 10° according to one embodiment of the present invention, and FIG. 6B is a schematic view of a micro mirror and active surface having an included angle 12° according to one embodiment of the present invention. Please refer to FIG. 2, FIG. 4, FIG. 5, FIG. 6A and FIG. 6B. The digital mirror devices 246, 247, and 248 shown in FIG. 2 are fundamental semiconductor components controlled by two-bit pulse modulation, and they are important imaging components in the DLP projector. In one embodiment of the present invention, the digital mirror device 246 is described in detail as an example, and the digital mirror devices 247 and 248 may be similar or identical. As shown in FIG. 5, the digital mirror device 246 includes an active surface 50 comprising a plurality of micro mirrors 51 arranged in a matrix structure. In one embodiment of the present invention, the micro mirrors 51 may be controlled by active components such as metal oxide semiconductor (MOS) disposed on the active surface 50.

In one embodiment of the present invention, the micro mirrors 51 may be operated in an angle ranging from about 10° to about −10° between the micro mirrors 51 and the active surface 50 (as shown in FIG. 6A), or ranging from about 12° to about −12° between the micro mirrors 51 and the active surface 50 (as shown in FIG. 6B). Hereinafter, the two embodiments of the operation of the micro mirrors 51 is described.

Please refer to FIG. 6A and FIG. 6B. When the angle between the micro mirrors 51 and the active surface is about 10° or about 12°, the angle between the incident light L0 and the reflected light L1 is about 20° or 24° respectively. Therefore, the reflected light L1 may pass through the non-masked region 32c (as illustrated in FIG. 4). Meanwhile, the state of the micro mirror 51 is ON.

Alternatively, when the angle between the micro mirrors 51 and the active surface is about −10° or about −12°, the angle between the incident light L0 and the reflected light L2 is about 40° or 48° respectively. Therefore, the reflected light L2 can not pass through the non-masked region 32c (as illustrated in FIG. 4). Meanwhile, the state of the micro mirror 51 is OFF.

Accordingly, in the light path of the present invention, the splitter component is adopted for splitting the light, and the TIR prisms, the X-cube and the projection lens are adopted for combining and projecting the split light. Therefore, the present invention has at least the following advantages. First, in the present invention, a lighter X-cube is adopted as a splitter component to replace the Philips prism for optical splitting and combining. Therefore, the digital mirror devices of the present invention does not need to be disposed in a specific angle since all the optical components may be disposed on the same plane. Therefore, the DLP projector of the present invention can be made thinner than the conventional ones.

Furthermore, since the light path in the X-cube is shorter, thus the time of the light traveling in the X-cube is shorter, and thus the influence of the thermal deformation of the X-cube is reduced.

Moreover, a mask layer may be further disposed on the TIR prism of the DLP projector in the present invention to avoid the influence of stray lights. Therefore, a smaller projection lens can be used.

In addition, since no special optical component is required in the DLP projector in the present invention, the cost can be reduced.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A digital light processing (DLP) projection device, comprising:
    a light source for providing a light;
    a splitter module disposed in an light path of the light after the light source, wherein the light is separated into a plurality of color lights by the splitter module, the color lights comprise a first color light, a second color light and a third color light and the splitter module comprises a first two-way splitter mirror disposed in the light path of the light after the light source, and a second two-way splitter mirror, disposed in a light path of the second color light and the third color light after the first two-way splitter mirror, wherein the first two-way splitter mirror reflects the first color light and allows the second color light and the third color light to penetrate, and the second two-way splitter mirror reflects the second color light and allows the third color light to penetrate;
    a plurality of total internal reflection (TIR) prisms disposed in a plurality of light paths of the color lights after the splitter module respectively, wherein each of the TIR prism comprises a total reflection plane;
    a plurality of digital mirror devices disposed in a plurality of light paths of the color lights after the TIR prisms respectively, wherein the color lights are reflected to the digital mirror devices via the total reflection planes respectively, and then the color lights are reflected by the digital mirror devices respectively and pass through the TIR prisms directly;
    a combiner disposed in an intersection of a plurality of light paths of the color lights passing through the TIR prisms; and
    a projection lens, disposed in a light path of the color lights after the combiner.

2. The DLP projection device of claim 1, wherein the light source comprises a rod integrator disposed in the light path of the light between the light source and the first two-way splitter mirror.

3. The DLP projection device of claim 2, wherein the splitter module further comprises at least one first condenser lens disposed in the light path of the light between the light source and the first two-way splitter mirror.

4. The DLP projection device of claim 3, wherein the splitter module further comprises a plurality of second condenser lenses disposed in a plurality of light paths of the first color light, the second color light and the third color light between the first two-way splitter mirror and the TIR prisms respectively.

5. The DLP projection device of claim 4, wherein a plurality of magnifications of the second condenser lenses disposed in the light paths of the first color light, the second color light and the third color light are mutually equal.

6. The DLP projection device of claim 1, wherein the splitter module further comprises at least one first reflection mirror disposed in a light path of the light between the light source and the first two-way splitter mirror.

7. The DLP projection device of claim 1, wherein the splitter module further comprises at least one second reflection mirror disposed in the light paths of the first color light, the second color light and the third color light between the first two-way splitter mirror and the TIR prisms.

8. The DLP projection device of claim 1, wherein each of the TIR prisms comprising:
   a first prism comprising the total reflection plane; and
   a second prism comprising a light incidence plane, wherein an air gap is located between the total reflection plane of the first prism and the light incidence plane of the second prism.

9. The DLP projection device of claim 1, wherein each of the digital mirror devices comprises an active surface, and each of the active surfaces comprises a plurality of micro mirrors arranged in a matrix structure.

10. The DLP projection device of claim 9, wherein an angle between the micro mirrors and the active surface is in a range of about 12° to about −12°, and an incident angle of each of the color lights being incident to the active surface of the digital mirror devices is 24° respectively.

11. The DLP projection device of claim 9, wherein an angle between the micro mirrors and the active surface is in a range of about 10° to about −10°, and an incident angle of each of the color lights being incident to the active surface of the digital mirror devices is 20° respectively.

12. The DLP projection device of claim 1, wherein the combiner comprises a X-cube comprising two mutually orthogonalized two-way splitter coatings.

* * * * *